US012370620B2

(12) United States Patent
Sharma et al.

(10) Patent No.: US 12,370,620 B2
(45) Date of Patent: Jul. 29, 2025

(54) ULTRASONIC WELDING SYSTEMS FOR CONDUCTIVE PINS, AND RELATED METHODS

(71) Applicant: Kulicke and Soffa Industries, Inc., Fort Washington, PA (US)

(72) Inventors: Devesh Sharma, Costa Mesa, CA (US); Peter Julius Klaerner, Corona, CA (US); Henri Seppaenen, Irvine, CA (US)

(73) Assignee: Kulicke and Soffa Industries, Inc., Fort Washington, PA (US)

( * ) Notice: Subject to any disclaimer, the term of this patent is extended or adjusted under 35 U.S.C. 154(b) by 0 days.

(21) Appl. No.: 18/636,502

(22) Filed: Apr. 16, 2024

(65) Prior Publication Data
US 2024/0351132 A1 Oct. 24, 2024

Related U.S. Application Data

(60) Provisional application No. 63/460,357, filed on Apr. 19, 2023.

(51) Int. Cl.
*B23K 20/00* (2006.01)
*B23K 20/10* (2006.01)

(52) U.S. Cl.
CPC .......... *B23K 20/106* (2013.01); *B23K 20/002* (2013.01)

(58) Field of Classification Search
CPC ........ B23K 9/205; B23K 9/206; B23K 20/10; B23K 20/1295
See application file for complete search history.

(56) References Cited

U.S. PATENT DOCUMENTS

| 3,189,297 | A | * | 6/1965 | Ellithorpe | B65G 51/06 406/111 |
| 3,765,075 | A | * | 10/1973 | Olney, Jr. | H05K 13/04 227/3 |
| 4,735,353 | A | * | 4/1988 | Thomson | B23K 20/1285 228/114.5 |
| 5,030,815 | A | * | 7/1991 | Glorioso | B23K 9/205 219/98 |
| 7,053,331 | B2 | * | 5/2006 | Citrich | B23K 9/0953 219/98 |
| 7,339,133 | B2 | * | 3/2008 | Citrich | B23K 9/205 219/98 |

(Continued)

FOREIGN PATENT DOCUMENTS

| EP | 2258508 | 12/2010 |
| JP | 2016215352 | 12/2016 |
| KR | 10-1576138 | 12/2015 |

OTHER PUBLICATIONS

WO2006/008123A1 English Computer Translation (Year: 2006).*
International Search Report for PCT application No. PCT/US2024/024708 completed on Jul. 24, 2024.

*Primary Examiner* — Erin B Saad
(74) *Attorney, Agent, or Firm* — Christopher M. Spletzer, Sr.

(57) ABSTRACT

An ultrasonic welding system is provided. The ultrasonic welding system includes a sonotrode configured to ultrasonically weld a conductive pin to a workpiece. The ultrasonic welding system also includes a pin feeding system configured to feed the conductive pin to the sonotrode, the pin feeding system including a pin supply tube.

13 Claims, 12 Drawing Sheets

(56) References Cited

U.S. PATENT DOCUMENTS

| | | | | |
|---|---|---|---|---|
| 8,434,768 B2* | 5/2013 | Schug | ............... | B23K 9/206 |
| | | | | 219/98 |
| 10,882,134 B2 | 1/2021 | Luechinger et al. | | |
| 11,850,676 B2* | 12/2023 | Copperthite | ........... | B23K 20/10 |
| 12,146,929 B2* | 11/2024 | Krahn | ................ | G01R 33/30 |
| 2021/0379690 A1* | 12/2021 | Copperthite | ........... | B23K 20/10 |
| 2023/0043068 A1 | 2/2023 | Copperthite et al. | | |

\* cited by examiner

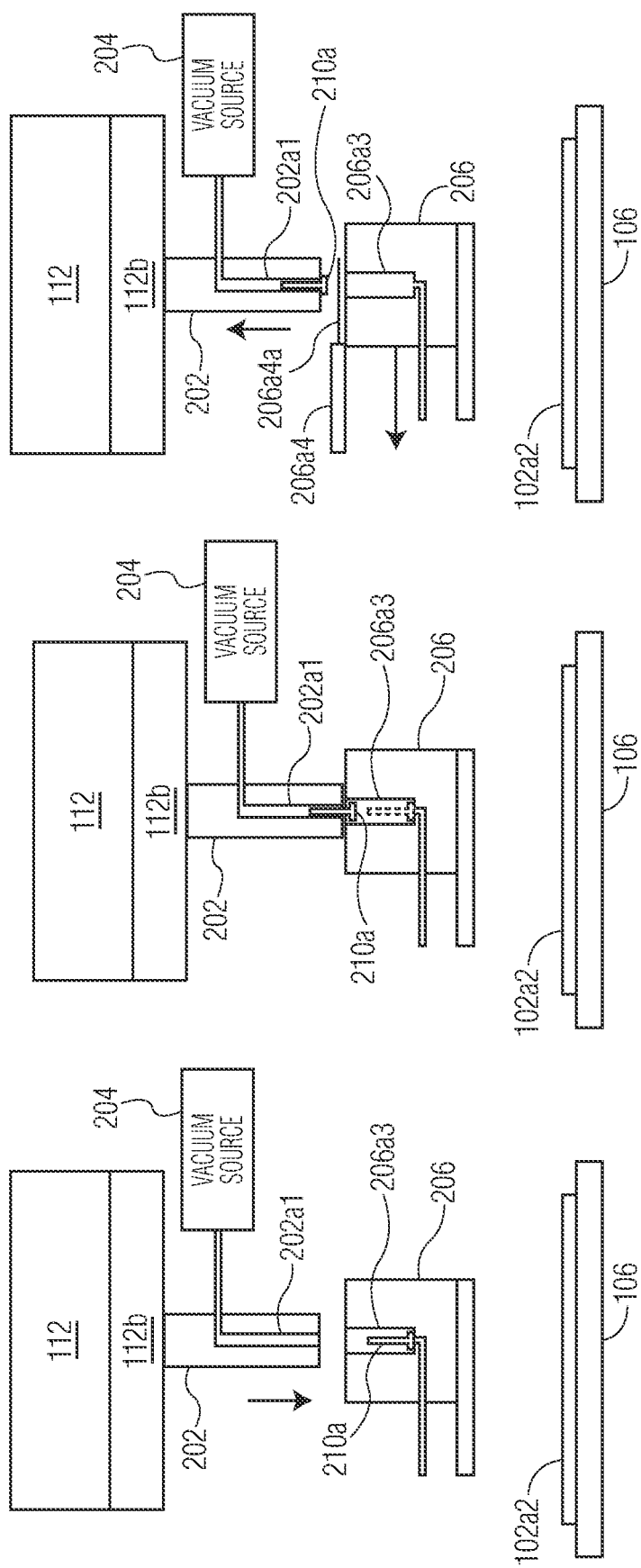

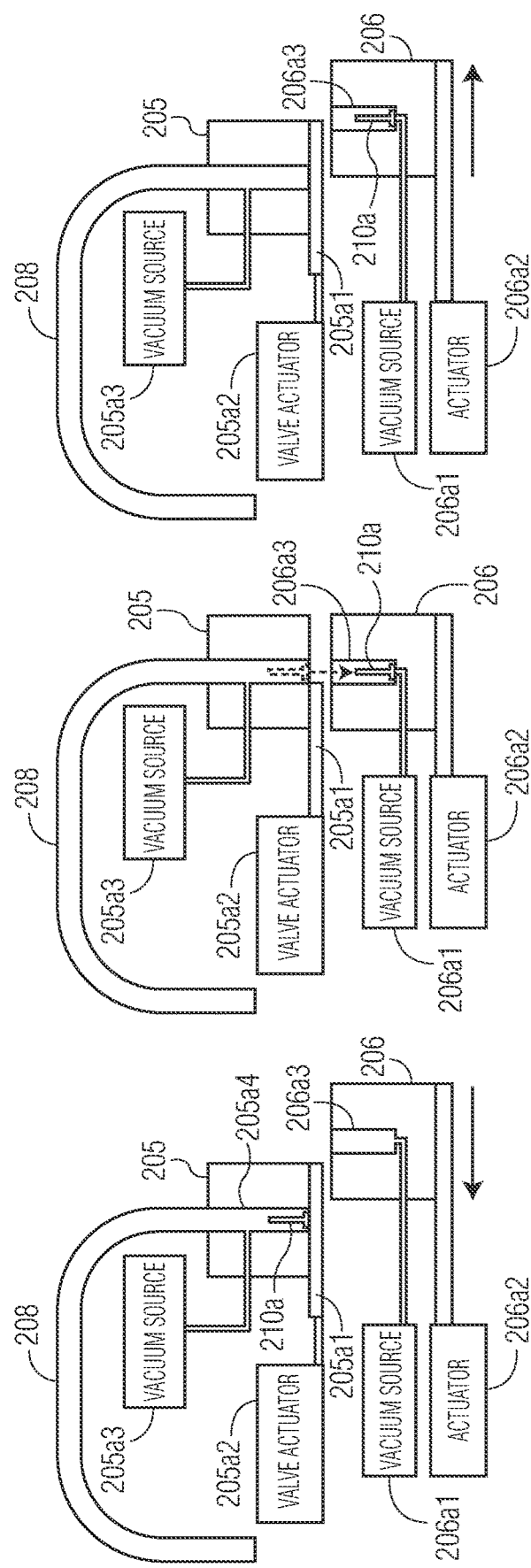

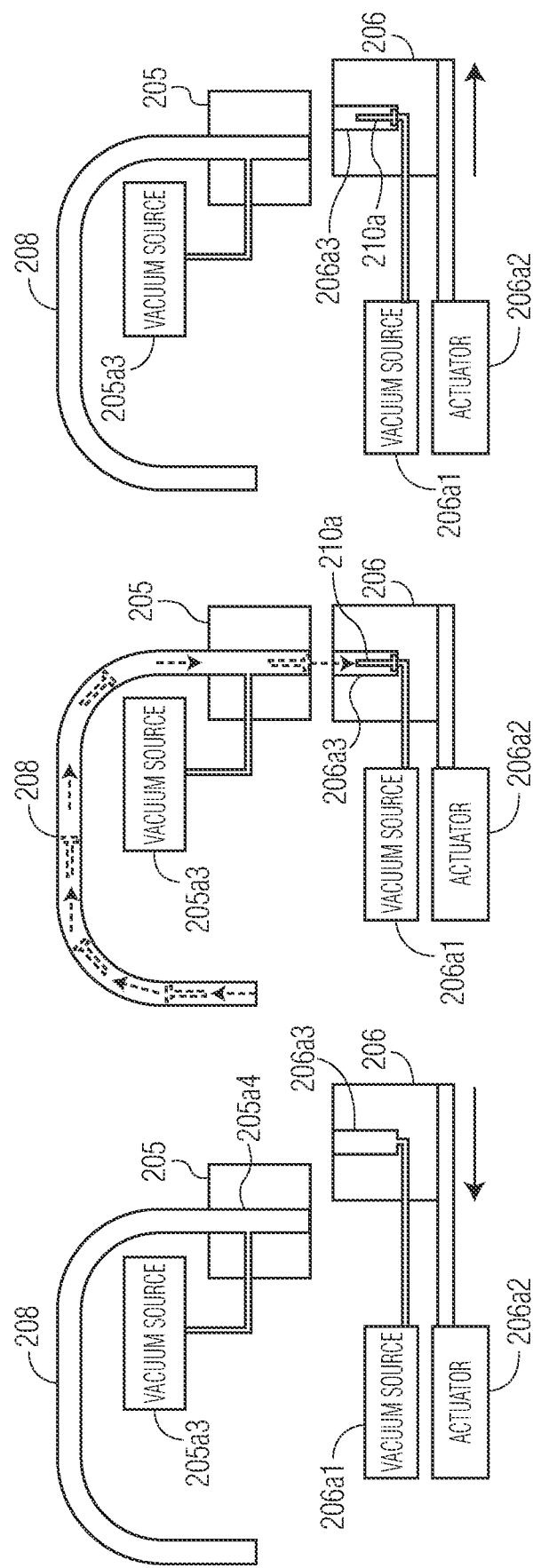

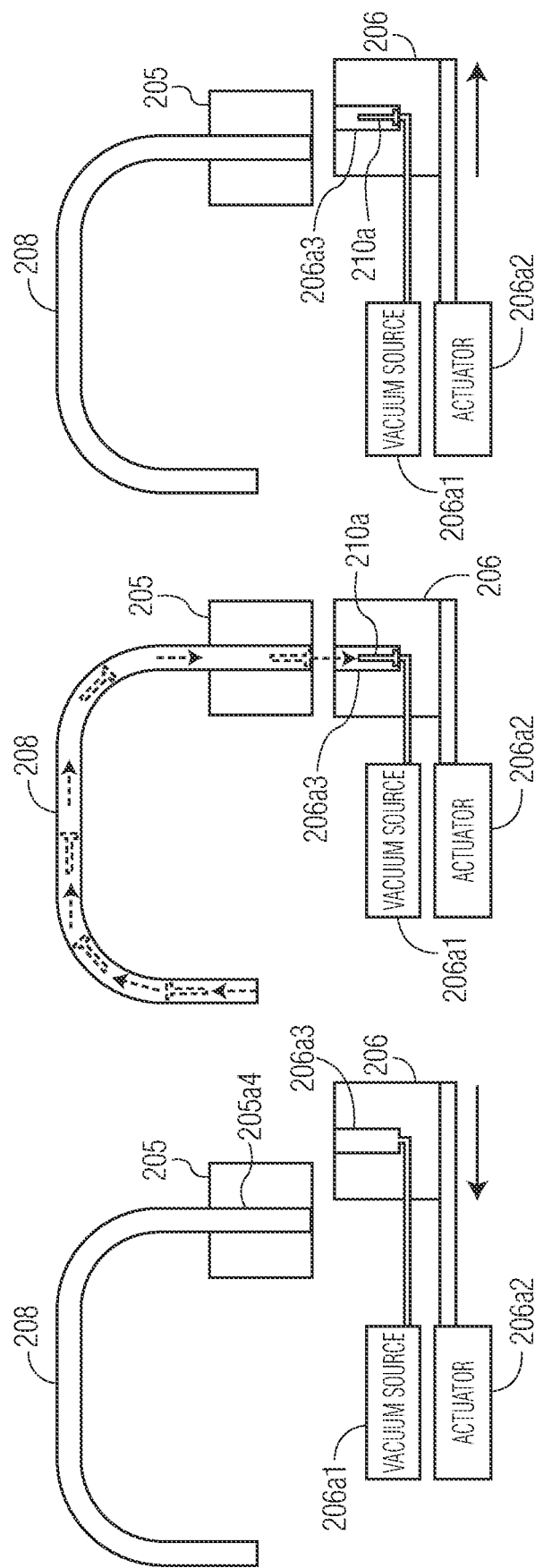

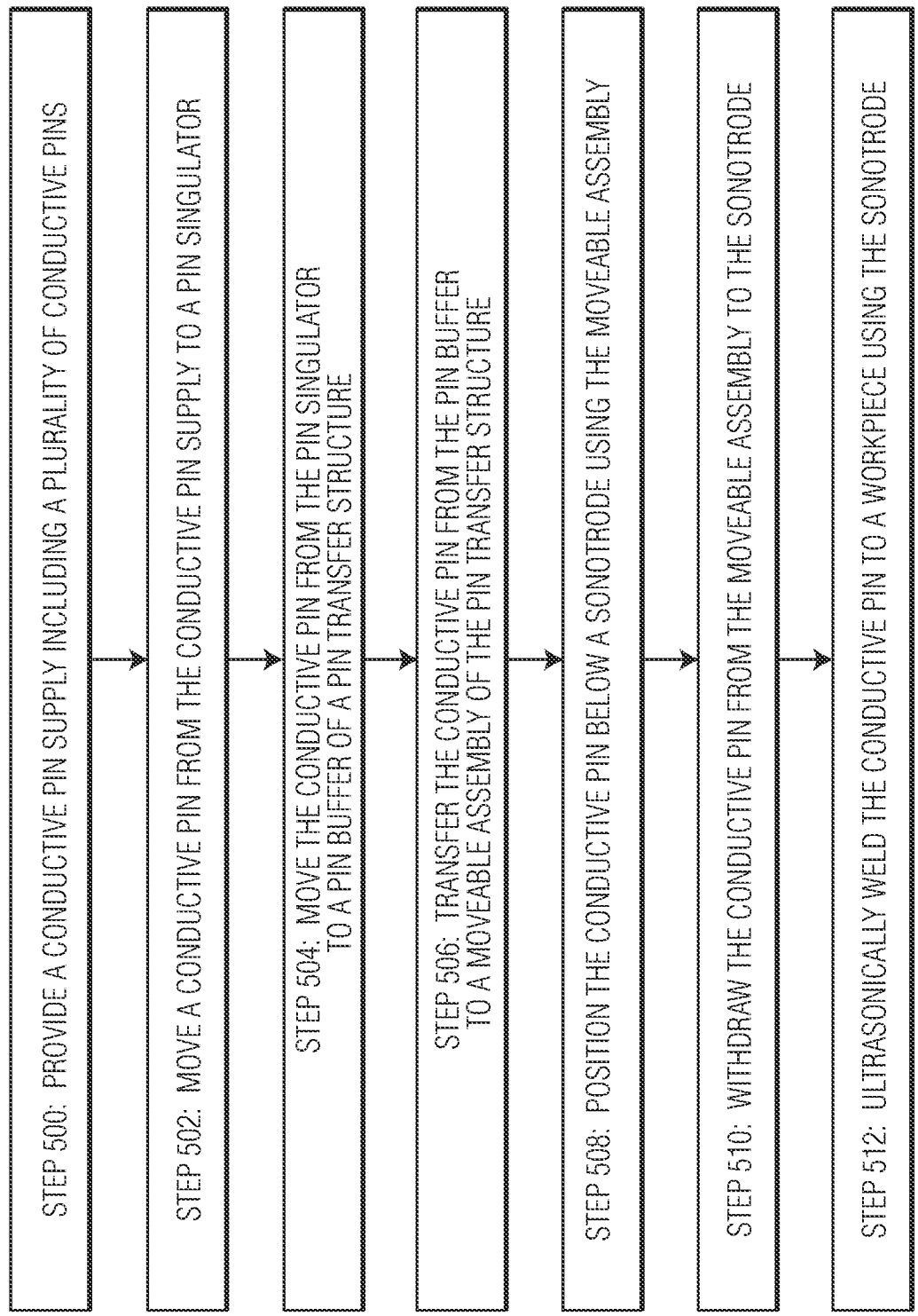

ULTRASONIC WELDING SYSTEMS FOR CONDUCTIVE PINS, AND RELATED METHODS

CROSS-REFERENCE TO RELATED APPLICATION

This application claims the benefit of U.S. Provisional Application No. 63/460,357, filed Apr. 19, 2023, the content of which is incorporated herein by reference.

FIELD

The invention relates to ultrasonic welding, and more particularly, to improved systems and methods for performing ultrasonic welding operations including conductive pin welding.

BACKGROUND

Ultrasonic welding is a technology used for joining conductive components. Ultrasonic welding may use an ultrasonic converter (e.g., carrying a sonotrode) for converting electrical energy into mechanical movement/scrub (e.g., linear movement/scrub, torsional movement/scrub, etc.). U.S. Pat. No. 10,882,134 (entitled "ULTRASONIC WELDING SYSTEMS AND METHODS OF USING THE SAME"), assigned to Kulicke and Soffa Industries, Inc., relates to improvements in ultrasonic welding technology, and is incorporated by reference in its entirety.

A specific application of ultrasonic welding technology relates to ultrasonic pin welding (where such pins are conventionally solder and/or press fit into power modules). U.S. Pat. No. 11,850,676 (entitled "ULTRASONIC WELDING SYSTEMS, METHODS OF USING THE SAME, AND RELATED WORKPIECES INCLUDING WELDED CONDUCTIVE PINS"), assigned to Kulicke and Soffa Industries, Inc., relates to improvements in ultrasonic welding technology related to conductive pins, and is also incorporated by reference in its entirety.

It would be desirable to provide improved ultrasonic welding systems including as related to ultrasonic pin welding.

SUMMARY

According to an exemplary embodiment of the invention, an ultrasonic welding system is provided. The ultrasonic welding system includes a sonotrode configured to ultrasonically weld a conductive pin to a workpiece. The ultrasonic welding system also includes a pin feeding system configured to feed the conductive pin to the sonotrode, the pin feeding system including a pin supply tube.

According to another exemplary embodiment of the invention, another ultrasonic welding system is provided. The ultrasonic welding system includes a sonotrode configured to ultrasonically weld a conductive pin to a workpiece. The ultrasonic welding system also includes a pin feeding system configured to feed the conductive pin to the sonotrode, the pin feeding system including a pin singulator for providing the conductive pin in a predetermined orientation.

According to yet another exemplary embodiment of the invention, another ultrasonic welding system is provided. The ultrasonic welding system includes a sonotrode configured to ultrasonically weld a conductive pin to a workpiece. The ultrasonic welding system also includes a pin feeding system configured to feed the conductive pin to the sonotrode, the pin feeding system including a pin transfer structure for transferring the conductive pin to the sonotrode.

According to yet another exemplary embodiment of the invention, a method of ultrasonically welding a conductive pin to a workpiece is provided. The method includes the steps of: (a) moving a conductive pin from a conductive pin supply to a sonotrode using a pin feeding system, the pin feeding system including a pin supply tube; and (b) ultrasonically welding the conductive pin to the workpiece using the sonotrode.

According to yet another exemplary embodiment of the invention, another method of ultrasonically welding a conductive pin to a workpiece is provided. The method includes the steps of: (a) moving a conductive pin from a conductive pin supply to a sonotrode using a pin feeding system, the pin feeding system including a pin singulator for providing the conductive pin in a predetermined orientation; and (b) ultrasonically welding the conductive pin to the workpiece using the sonotrode.

According to yet another exemplary embodiment of the invention, another method of ultrasonically welding a conductive pin to a workpiece is provided. The method includes the steps of: (a) moving a conductive pin from a conductive pin supply to a sonotrode using a pin feeding system, the pin feeding system including a pin transfer structure for transferring the conductive pin to the sonotrode; and (b) ultrasonically welding the conductive pin to the workpiece using the sonotrode.

According to exemplary aspects of the invention, the ultrasonic welding systems and methods referred to in the preceding six (6) paragraphs may include any one or more of the following features: a pin supply tube for providing the conductive pin to the sonotrode; the conductive pin is moved through the pin supply tube using at least one of (i) vacuum pressure and (ii) pneumatic pressure; a pin supply including a plurality of conductive pins; a pin singulator for providing the conductive pin in a predetermined orientation to the pin supply tube; the pin singulator provides the conductive pin in the predetermined orientation to the pin supply tube; the pin singulator provides a plurality of conductive pins in a predetermined orientation; the predetermined orientation is in a heads up orientation such that a head of the conductive pin is drawn into the pin supply tube as it travels toward the sonotrode; a pin transfer structure for transferring the conductive pin from the pin supply tube to the sonotrode; the pin transfer structure includes a pin buffer for staging the conductive pin prior to transfer to the sonotrode; the pin transfer structure includes a pin buffer for staging a plurality of conductive pins prior to transfer of the conductive pin to the sonotrode; the pin transfer structure includes a moveable assembly for moving the conductive pin to a position adjacent a working end of the sonotrode; the sonotrode is configured to withdraw the conductive pin from the moveable assembly using a vacuum source integrated with the sonotrode; an actuatable valve allows the conductive pin to be transferred from the pin buffer to the moveable assembly when the valve is in an open position, and that retains the conductive pin at the pin buffer when the valve is in a closed position; and/or the pin supply tube is configured to feed a plurality of conductive pins simultaneously toward the sonotrode.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures:

FIGS. 3A-3C are block diagram side views illustrating elements of a pin feeding system, and related operations, in accordance with another exemplary embodiment of the invention;

FIGS. 4A-4C are block diagram side views illustrating elements of another pin feeding system, and related operations, in accordance with another exemplary embodiment of the invention; and FIG. 5 is a flow diagram illustrating a method of ultrasonically welding a conductive pin to a workpiece, in accordance with an exemplary embodiment of the invention.

DETAILED DESCRIPTION

In accordance with certain exemplary embodiments of the invention, pin handling systems and/or pin feeding systems are provided for ultrasonic welding systems. For example, such pin handling systems and/or pin feeding systems may be used to move conductive pins from a conductive pin source (e.g., a pin storage bowl) to a sonotrode (e.g., the working end or "tip" of the sonotrode), using elements such as a pin supply tube (e.g., a vacuum tube), a pin singulator, and/or a pin transfer structure (e.g., including a mechanical lever, an arm, or the like). According to certain exemplary embodiments of the invention, a pin transfer structure (e.g., a pin feeder arm) may be mechanically attached to a moving weld head assembly (e.g., where both are carried by a common gantry system) (e.g., where the pin transfer structure moves with the weld head assembly along one or more motion axes). Such a pin transfer structure may be used to directly transfer conductive pins to the sonotrode.

Thus, one specific exemplary aspect of the invention is the movement of conductive pins from a pin supply source to a pick up location, for example, using a pin supply tube. Another specific exemplary aspect of the invention may use the pin transfer structure to transfer pins from the pick up location to the sonotrode.

Aspects of the invention provide certain benefits over conventional ultrasonic welding systems, for example, in terms of the increased speed of the ultrasonic welding cycle.

Figure 1:
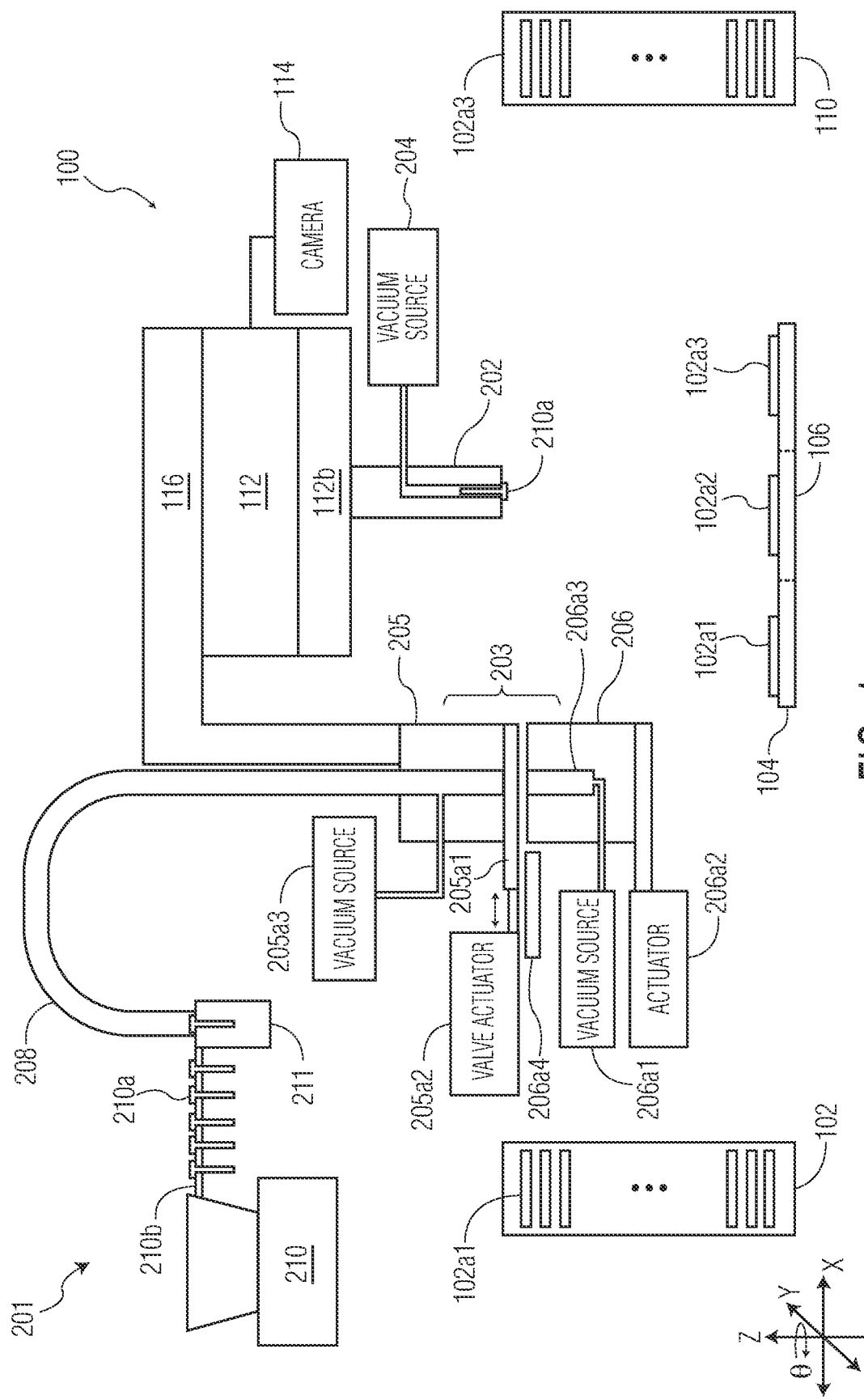
FIG. 1 is a block diagram side view illustrating an ultrasonic welding system in accordance with an exemplary embodiment of the invention.

FIG. 1 illustrates an ultrasonic welding system 100. Ultrasonic welding system 100 includes an input workpiece supply 102 for providing a workpiece 102a1, where input workpiece supply 102 is configured to carry a plurality of workpieces 102a1 (e.g., workpiece supply 102 may be a carrier such as a magazine handler for carrying a plurality of workpieces 102a1, or other supply structures suitable for the application specific workpiece, etc.). Exemplary workpieces 102a1 carried by input workpiece supply 102 include power modules, components of power modules, lead frames, battery modules, etc. Workpieces 102a1 are provided (by any desired transport assembly which may be included in a material handling system 104, such as a gripper assembly) from input workpiece supply 102 to a material handling system 104. Material handling system 104 moves workpiece 102a1 (e.g., using a conveyor assembly, using a gripper assembly, etc.) from input workpiece supply 102 to a support structure 106. Support structure 106 supports the workpiece (now labelled as a clamped workpiece 102a2, when clamped against support structure 106 using a workpiece clamp) during a welding operation. After the ultrasonic welding operation (described below with respect to a weld head assembly 112), a now welded workpiece 102a3 is moved (e.g., using a conveyor assembly, using a gripper assembly, etc.) from a portion of material handling system 104 downstream of support structure 106, to an output workpiece supply 110. Output workpiece supply 110 is configured to receive welded workpieces 102a3 after processing by weld head assembly 112 (where weld head assembly 112 includes an ultrasonic converter 112b carrying a sonotrode 202). Output workpiece supply 110 may be a carrier such as a magazine handler for carrying a plurality of welded workpieces 102a3, or another supply structure suitable for the application specific workpiece.

Ultrasonic welding system 100 also includes weld head assembly 112. Weld head assembly 112 includes ultrasonic converter 112b carrying a sonotrode 202, and is moveable along a plurality of substantially horizontal axes. For example, weld head assembly 112 may be configured to move along a plurality of horizontal axes (e.g., a horizontal x-axis and a horizontal y-axis of ultrasonic welding system 100). As shown in FIG. 1, weld head assembly 112 is carried by a gantry 116. Thus, movement of gantry 116 along the plurality of horizontal axes may provide the motion of weld head assembly 112 along such axes.

Weld head assembly 112 may also be configured to move along a vertical z-axis of ultrasonic welding system 100, and about a theta axis (Ø-axis) of ultrasonic welding system 100. For example, weld head assembly 112 may be configured to move along the z-axis, and/or about the theta axis, independently of gantry 116. Not all of these motion axes are required in each application. Using the motion axes of weld head assembly 112, sonotrode 202 is able to be moved into proper welding positions with respect to a clamped workpiece 102a2.

Ultrasonic welding system 100 also includes a camera 114 (where camera 114 may optionally be carried by weld head assembly 112, or may be carried by another part of ultrasonic welding system 100) for imaging operations related to the alignment between sonotrode 202 and clamped workpiece 102a2, the alignment of the components of clamped workpiece 102a2 in itself, optical inspection of the welds after welding operation, etc.

Various types of workpieces may be welded using ultrasonic welding system 100 (or other systems within the scope of the invention). Exemplary workpieces include a power module, a lead frame and a battery module.

Various types of ultrasonic motion may be imparted on a conductor (e.g., a conductive pin) in accordance with the invention. For example, the sonotrode may be configured to weld a conductor to a workpiece using at least one of linear ultrasonic motion and torsional ultrasonic motion.

Certain of those workpieces are configured to receive a conductive pin. As used herein, the term "conductive pin" is a conductive structure intended to be ultrasonically welded to a workpiece. The conductive pin may have a free end (after being welded to a workpiece), and a body portion of the conductive pin may extend substantially vertically from a "welded" end to the free end. The cross section of the conductive pin may be round, square, rectangular, or have any desired cross section. The term conductive pin shall also be construed to include conductive receptacles or sleeves (e.g., a tubular shape such as a rivet), where the conductive receptacle/sleeve is ultrasonically welded to a workpiece, and configured to receive another conductive element. In accordance with certain exemplary embodiments of the invention, ultrasonic welding system 100 includes a conductive pin supply 210 configured to provide a plurality of conductive pins 210a for welding using sonotrode 202. Exemplary configurations for conductive pin supply 210 include: a grid arrangement (including columns and rows of conductive pins, oriented in such a way for ease of pick up), a bowl feeder, a hopper, a spool, etc.

Figure 2A:
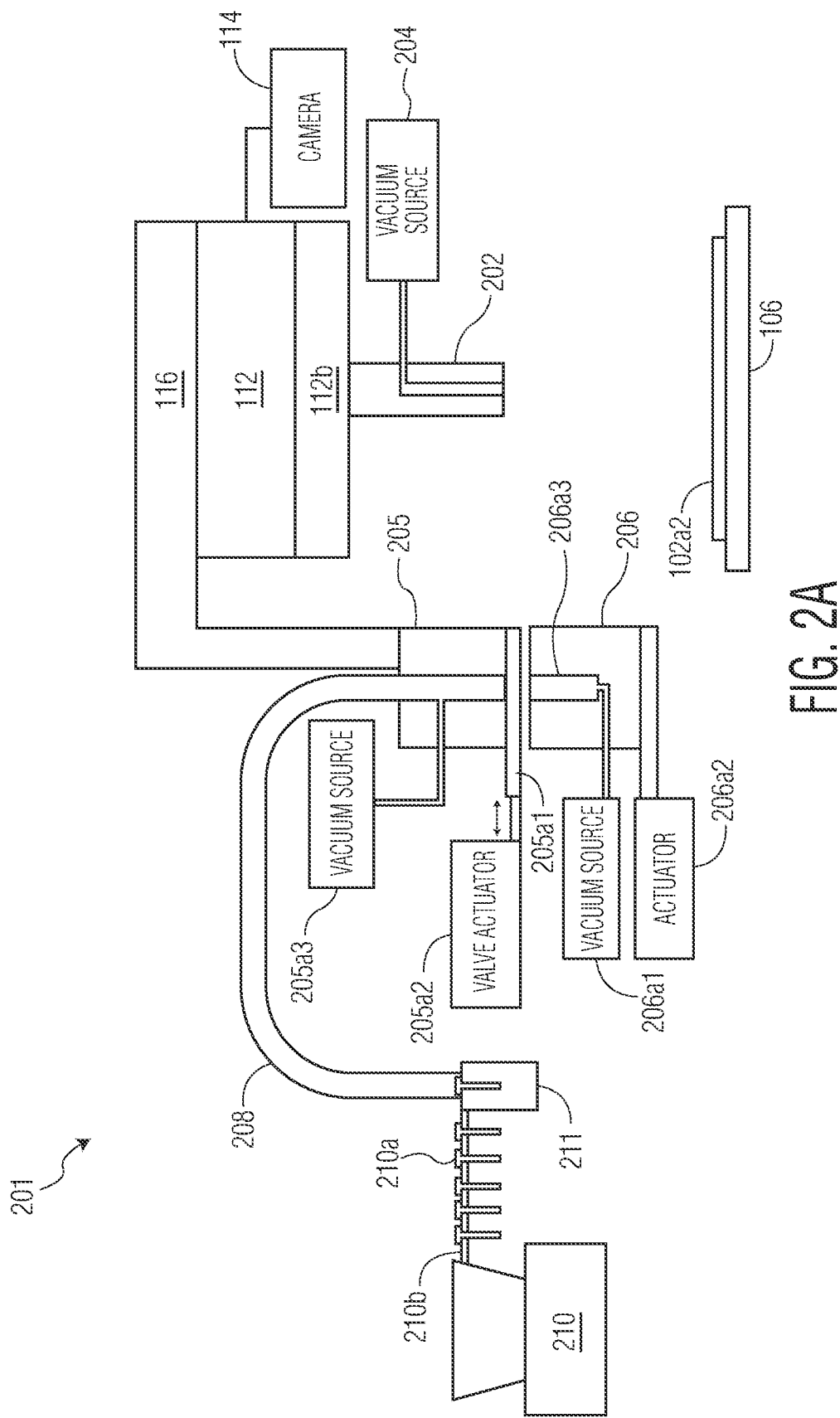
FIGS. 2A-2N are block diagram side views illustrating elements of the ultrasonic welding system of FIG. 1, and related operations, in accordance with an exemplary embodiment of the invention.

Ultrasonic welding system 100 also includes a pin feeding system 201. FIG. 1 and FIGS. 2A-2N illustrate elements of a pin feeding system 201 (and/or a conductive pin handling system). In the embodiment shown in FIG. 1, pin feeding system 201 includes conductive pin supply 210, a pin holder 210b, a pin singulator 211, a pin supply tube 208, and a pin transfer structure 203.

FIG. 1 illustrates a conductive pin supply 210 including a plurality of conductive pins 210a. As will be detailed below, conductive pins 210a exit conductive pin supply 210 to pin holder 210b. Pin singulator 211 receives the conductive pins 210a from pin holder 210b, and provides conductive pins 210a in a predetermined orientation (e.g., a heads up orientation) such that a head of a conductive pin 210a is drawn into the pin supply tube 208 as it travels toward sonotrode 202. Using vacuum from a vacuum source 205a3 (or another mechanism, such as using pneumatic pressure), conductive pins 210a are transferred to pin transfer structure 203. More specifically, conductive pins 210a are transferred to a pin buffer 205. Pin transfer structure 203 includes pin buffer 205 (e.g., for staging one or more conductive pins 210a prior to transfer of a conductive pin 210a to the sonotrode) and a moveable assembly 206 (e.g., for moving one or more conductive pins 210a to a position adjacent a working end of the sonotrode 202). Gantry 116 is illustrated carrying certain elements of pin transfer structure 203 including pin buffer 205 and movable assembly 206. Thus, as illustrated in the embodiment of FIG. 1, gantry 116 is configured to move (e.g., simultaneously in a horizontal direction) weld head assembly 112 and the carried elements of pin transfer structure 203 (e.g., pin buffer 205, movable assembly 206, etc.). As illustrated in certain figures herein (e.g., FIG. 2D) moveable assembly 206 may be independently moved (e.g., rotated and/or translated in a horizontal axis) from other elements carried by gantry 116 (e.g., pin buffer 205, weld head assembly 112, etc.).

In the embodiment of the invention shown in FIG. 1, pin feeding system 201 also includes a valve 205a1, a valve actuator 205a2, a vacuum source 205a3, a vacuum source 206a1, and an actuator 206a2. Valve actuator 205a2 controls valve 205a1 to release a conductive pin 210a from pin buffer 205 to moveable assembly 206. Vacuum source 206a1 is used to draw and/or retain the conductive pin 210a at a pin hole 206a3 of moveable assembly 206 (e.g., a pin hole defined by moveable assembly 206, and configured to receive a conductive pin 210a). Actuator 206a2 is used to move (e.g., through linear motion, rotative motion, swinging motion, sliding motion, etc.) moveable assembly 206 to a position adjacent a working end of sonotrode 202. In this position, a vacuum source 204 integrated with sonotrode 202 is used to withdraw the conductive pin 210a from moveable assembly 206. Thus, sonotrode 202 is now ready to ultrasonically weld (e.g., through torsional motion) conductive pin 210a to a workpiece.

FIGS. 2A-2N show exemplary details of the operation described above. Referring specifically to FIG. 2A, pin buffer 205 and/or moveable assembly 206 does not include a conductive pin 210a. Conductive pin supply 210 (e.g., a bowl feeder, a hopper, a shaker, etc.) provides conductive pins 210a in a predetermined orientation (e.g., flanged head of pin on top as illustrated, oriented horizontally, or in some other predetermined orientation). Pin singulator 211 receives a conductive pin 210a from pin holder 210b. While engaged in pin singulator 211, the conductive pin 210a is positioned under pin supply tube 208. In the illustrated embodiment, pin supply tube 208 is positioned above the head of conductive pin 210a with a gap (e.g., 50-1000 microns). The presence of conductive pin 210a in pin singulator 211 may be confirmed, for example, using an optical sensor, a proximity sensor, a pressure transducer, a pneumatic sensor, and/or an inductive sensor (not illustrated). Pin singulator 211 may be actuated in a number of different ways (e.g., rotary actuated, linearly actuated, etc.) and may be configured to hold more than one conductive pin 210a (e.g., different sized conductive pins).

Figure 2B:
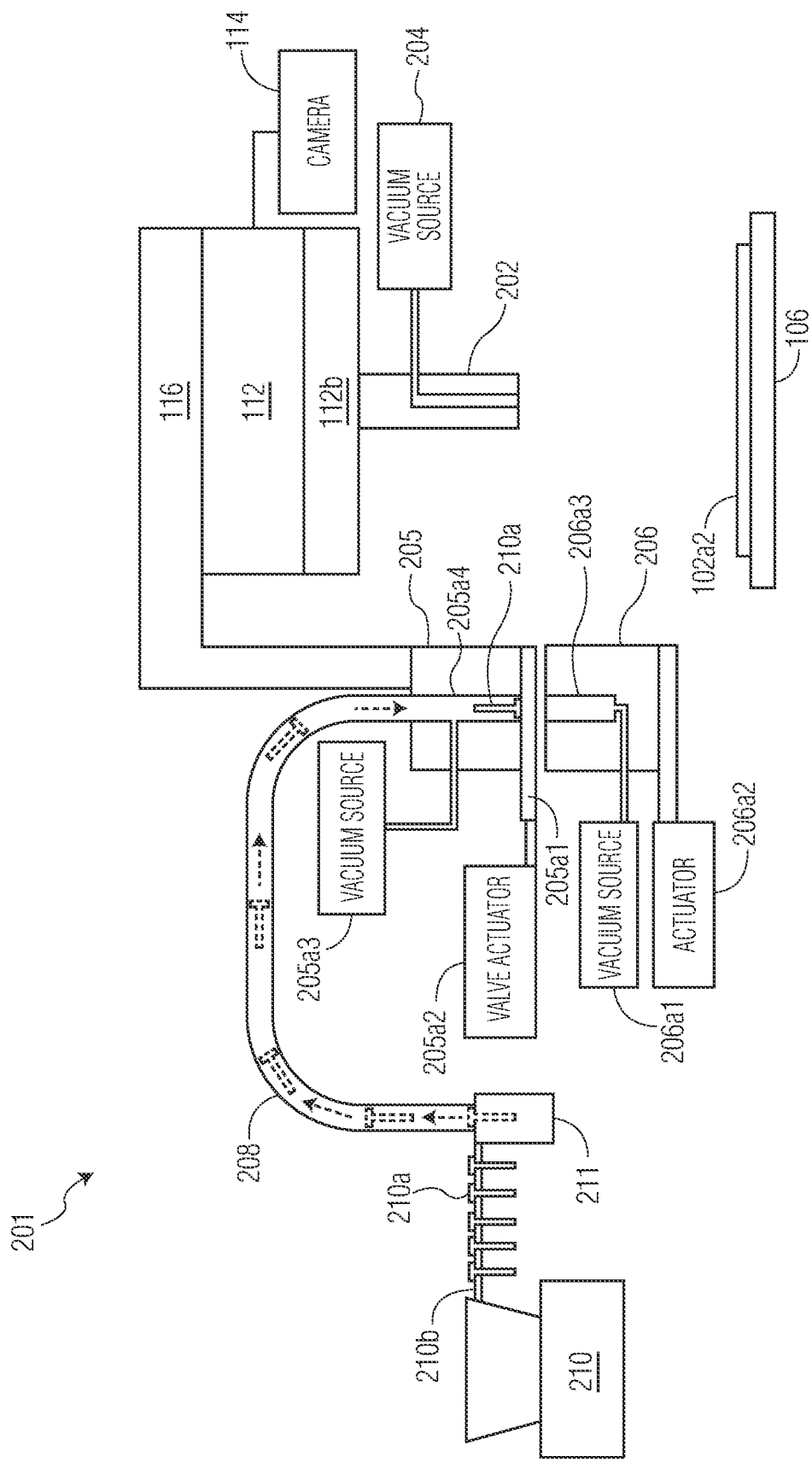

Referring now to FIG. 2B, a conductive pin 210a has been received by pin singulator 211, and is positioned under pin supply tube 208 (e.g., with valve 205a1 in a closed position). With vacuum from vacuum source 205a3 turned on, the conductive pin 210a is sucked up from pin singulator 211, and travels through the length of pin supply tube 208 until it reaches pin buffer 205 (e.g., until it reaches a pin hole 205a4 defined by pin buffer 205). Of course, although vacuum is described as the mechanism for drawing conductive pin 210a through pin supply tube 208, it is understood that pneumatic pressure (e.g., using a pneumatic nozzle), electromagnetic fields, or other mechanisms may be utilized.

The presence of the conductive pin 210a may be sensed in pin buffer 205 using a sensor (e.g., an inductive sensor, a proximity sensor, a pressure transducer, a pneumatic sensor, and/or an optical sensor) placed inside pin buffer 205, placed outside pin supply tube 208 near the entrance of pin buffer 205, or placed at another nearby location. At this time, vacuum from vacuum source 205a3 may be turned off (and/or turned down).

The process described herein allows the transfer of a single conductive pin 210a, or multiple conductive pins 210a in a consecutive manner. It should be understood that conductive pin supply 210 may be on a distinct structure or machine as compared to other elements of ultrasonic welding system 100 (e.g., sonotrode 202).

Figure 2C:
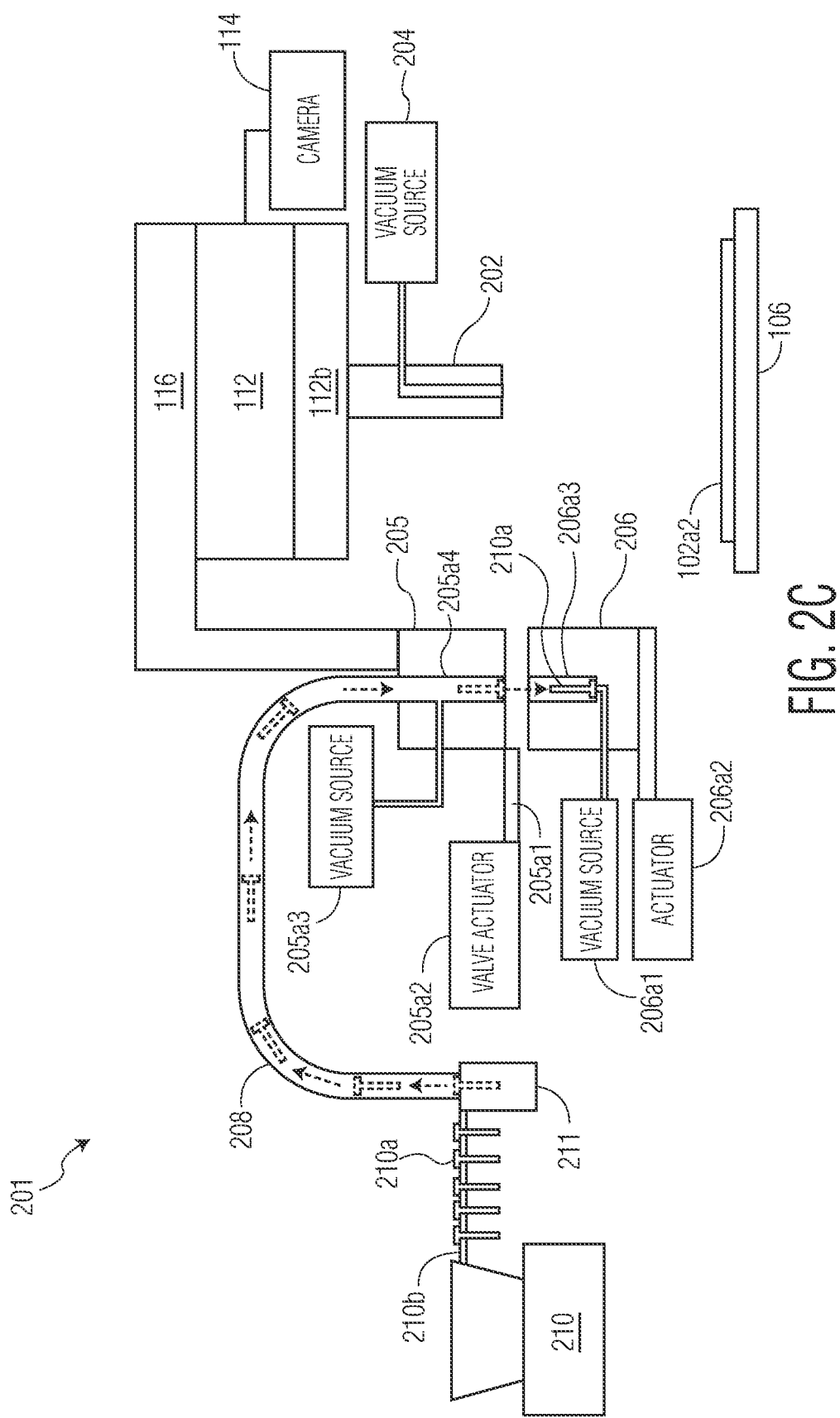

Referring now to FIG. 2C, once the conductive pin 210a is at pin buffer 205, with moveable assembly 206 positioned under pin buffer 205 (e.g., with pin holes 205a4 and 206a3 aligned within a certain tolerance), valve 205a1 may be actuated to be in an open position (e.g., using actuator 205a2, such as a rotary or linear actuator). At the same time (or in close time proximity) as valve 205a1 is opened, a vacuum from vacuum source 206a1 may be turned on in connection with moveable assembly 206. Thus, conductive pin 210a may be transferred (e.g., sucked down, dropped down, etc.) from pin buffer 205 to moveable assembly 206. The presence of conductive pin 210a may be sensed in moveable assembly 206 (e.g., using a sensor such as an optical sensor or a vacuum pressure switch), and then valve 205a1 may be actuated to be in a closed position. The process of transferring another conductive pin 210a to pin buffer 205 may then be repeated.

Although pin buffer 205 is illustrated housing only a single conductive pin 210a, it is understood that multiple conductive pins 210a may be staged at pin buffer 205 (e.g., where each conductive pin 210a may be indexed, one by one, into the moveable assembly 206 using an appropriate indexing mechanism).

Valve 205a1 may be used to ensure that, in the case that vacuum from vacuum source 205a3 is used to suck a pin from the pin singulator 211, valve 205a1 allows enough vacuum pressure to be generated on the pin singulator 211 end of the supply tube 208.

Figure 2D:
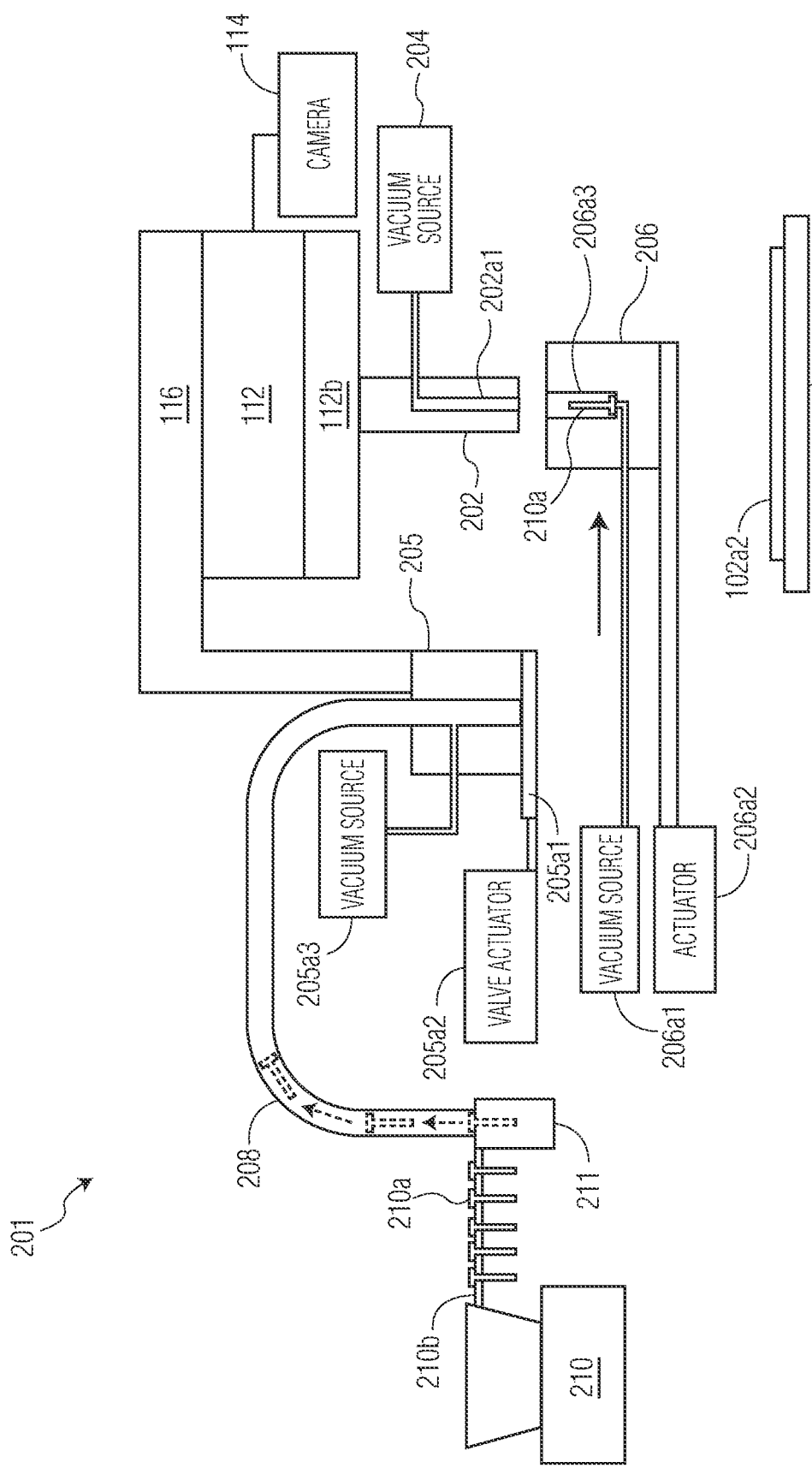

Referring now to FIG. 2D, once conductive pin 210a is engaged with (e.g., is inside) moveable assembly 206, moveable assembly 206 is moved to a position under sonotrode 202 using actuator 206a2 (e.g., a rotary actuator, a linear actuator, etc.) such that a pin hole 202a1 (defined by sonotrode 202a) and pin hole 206a3 are aligned within a certain tolerance.

Referring now to FIG. 2E, once moveable assembly 206 is properly positioned under sonotrode 202, sonotrode 202 may be moved down until it either sits on a top surface of moveable assembly 206, or is just above the surface by a gap (e.g., 50-200 microns). Of course, if certain design tolerances are achieved, sonotrode 202 may not need to be moved down.

Referring now to FIG. 2F, with sonotrode 202 in an acceptable position with respect to moveable assembly 206, vacuum from vacuum source 206a1 may be turned off, and a vacuum from vacuum source 204 may be turned on, such that conductive pin 210a is received by sonotrode 202. That is, the vacuum in pin hole 202a1 (provided using vacuum source 204) causes the conductive pin 210a to be sucked up from the pin hole 206a3 in moveable assembly 206 such that the conductive pin 210a now rests in the sonotrode 202.

In certain embodiments of the invention, the position of moveable assembly 206 may be compliant along a vertical axis (e.g., the z-axis) such that sonotrode 202 may positively engage with the surface of moveable assembly 206.

Referring now to FIG. 2G, with conductive pin 210a now held by sonotrode 202 (and possibly after a desirable wait time period, such as 30-50 ms), sonotrode 202 may then move back up such that sensor 206a4 (e.g., an optical sensor) on moveable assembly 206 may confirm adequate clearance between sonotrode 202 and moveable assembly 206. If clear, moveable assembly 206 moves back under pin buffer 205 to receive the next pin (e.g., see FIGS. 2L-2N, FIGS. 3A-3C, and/or FIGS. 4A-4C). If not clear (e.g., conductive pin 210a is not properly seated in sonotrode 202), an attempt may be made to reseat conductive pin 210a (e.g., using ultrasonic vibration from converter 112b, or by toggling a vacuum from vacuum source 204 on-off). In the illustrated embodiment, sensor 206a4 is an optical sensor providing an unbroken light beam 206a4a, indicating adequate clearance between sonotrode 202 and moveable assembly 206.

Figure 2I:
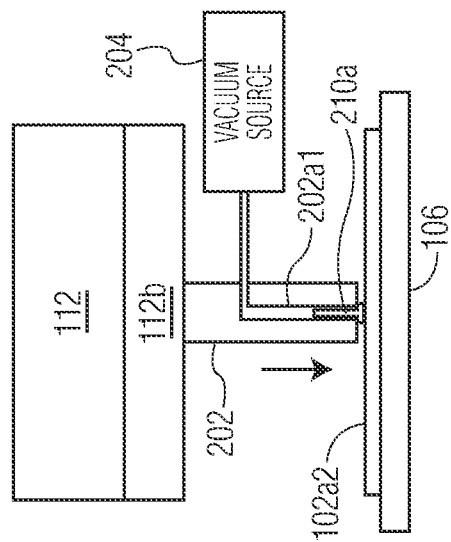
Figure 2H:
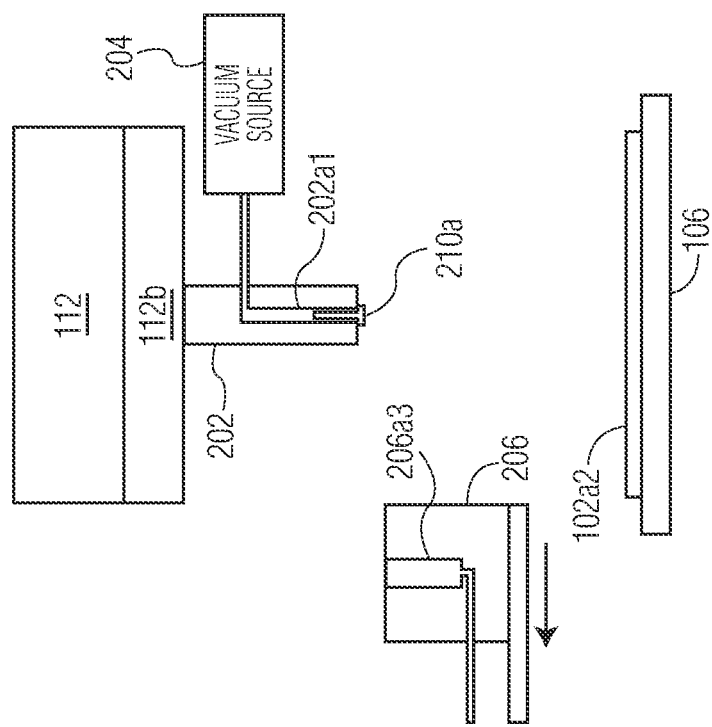

In any event, with conductive pin 210a now held by sonotrode 202, conductive pin 210a may be ultrasonically welded to a workpiece. Referring now to FIG. 2H, moveable assembly 206 is illustrated having been moved out of the way from sonotrode 202 and workpiece 102a2. Referring now to FIG. 2I, sonotrode 202 is illustrated ultrasonically welding (e.g., through torsional motion) conductive pin 210a to workpiece 102a2.

While conductive pin 210a is being welded to workpiece 102a2 (as shown in FIG. 2I), moveable assembly 206 may receive (synchronously) another conductive pin 210a from pin buffer 205 (e.g., see FIGS. 2L-2N, FIGS. 3A-3C, and/or FIGS. 4A-4C).

Figure 2K:
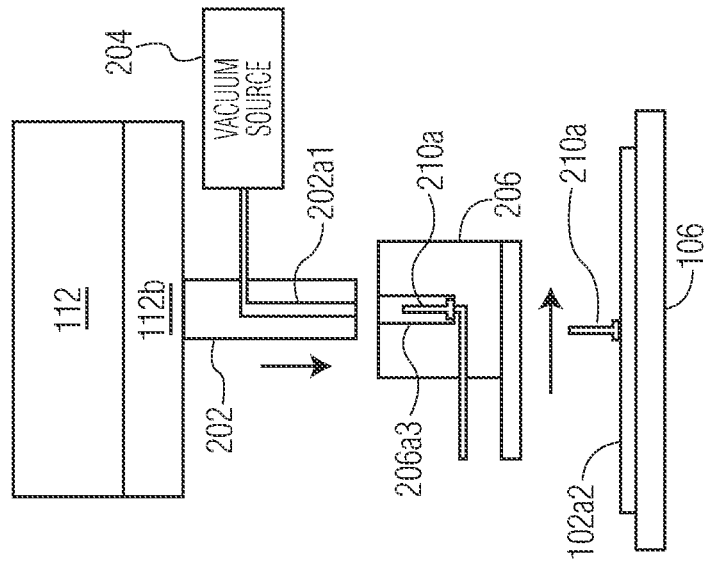
Figure 2J:
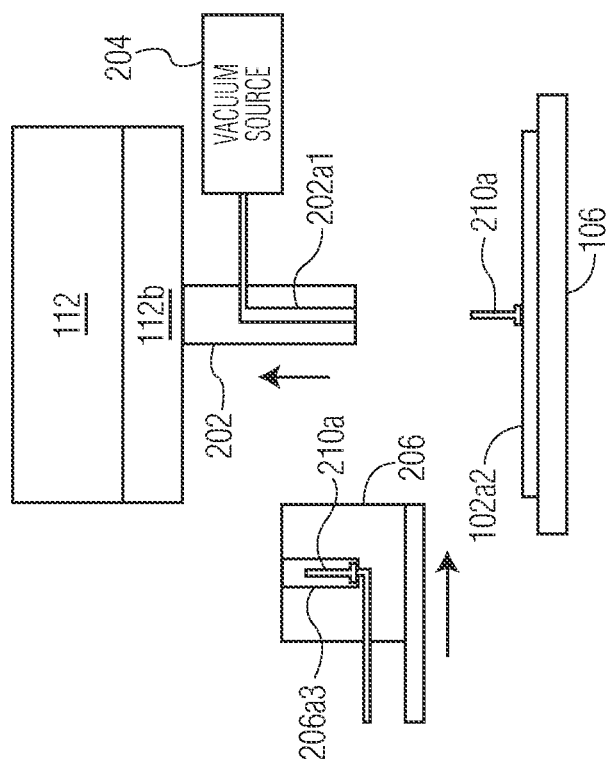

Referring now to FIG. 2J, after receiving another conductive pin 210a, moveable assembly 206 is illustrated moving towards sonotrode 202 while sonotrode 202 moves upwards (e.g., simultaneously, synchronously, etc.).

Referring now to FIG. 2K, moveable assembly 206 is illustrated beneath sonotrode 202, while sonotrode 202 moves back down towards moveable assembly 206 to receive the another conductive pin 210a (e.g., where the process illustrated in FIGS. 2E-2G may be repeated).

Referring now to FIGS. 2L-2N, a retrieval process (for retrieving a conductive pin 210a) using an exemplary pin feeding system is illustrated. Referring specifically to FIG. 2L, moveable assembly 206 is illustrated moving back to pin buffer 205 to receive a conductive pin 210a. At FIG. 2M, valve 205a1 is illustrated partially retracted by valve actuator 205a2 and the conductive pin 210a is transferred to moveable assembly 206. In certain embodiments, vacuum source 206a1 provides a greater suction force than vacuum source 205a3 (or vacuum from vacuum source 205a3 may be reduced or shut off), thereby drawing the conductive pin 210a from pin buffer 205 to moveable assembly 206. At FIG. 2N, moveable assembly 206 is moving back to a position below sonotrode 202 (similar to the process shown in FIGS. 2J-2K).

The pin retrieval process illustrated in FIGS. 2L-2N is one embodiment of the invention; however, the invention is not so limited. For example, FIGS. 3A-3C illustrate another pin retrieval process using another exemplary pin feeding system. The illustrated pin retrieval process is similar to that of FIGS. 2L-2N, except the another exemplary pin feeding system does not include valve 205a1 and/or valve actuator 205a2. More specifically, in FIG. 3A, moveable assembly 206 is moving back to a position below pin buffer 205. In FIG. 3A, pin buffer has not yet received a conductive pin 210a. After moveable assembly 206 is positioned below pin buffer 205 (as shown in FIG. 3B), a conductive pin 210a is brought through supply tube 208, and to moveable assembly 206 (e.g., using vacuum from vacuum source 205a3 and/or vacuum source 206a1). In FIG. 3C, moveable assembly 206 is moving back to a position below sonotrode 202 (similar to the process shown in FIGS. 2J-2K).

FIGS. 4A-4C illustrate yet another pin retrieval process using yet another exemplary pin feeding system. The illustrated pin retrieval process is similar to that of FIGS. 3A-3C, except the yet another exemplary pin feeding system does not include vacuum source 205a3. More specifically, in FIG. 4A, moveable assembly 206 is moving back to a position below pin buffer 205. After moveable assembly 206 is positioned below pin buffer 205 (as shown in FIG. 4B), a conductive pin 210a is brought through supply tube 208, and to moveable assembly 206 (e.g., using vacuum from vacuum source 206a1). In FIG. 4C, moveable assembly 206 is moving back to a position below sonotrode 202 (similar to the process shown in FIGS. 2J-2K).

Exemplary aspects of the invention allow a single conductive pin supply (e.g., conductive pin supply 210) to be shared among several ultrasonic welding head assemblies (each including a sonotrode). For example, a single conductive pin supply 210 may provide conductive pins 210a to a plurality of pin supply tubes 208 (e.g., extending from one or more pin singulators 211).

FIG. 5 is a flow diagram illustrating a method of ultrasonically welding a conductive pin to a workpiece (e.g., using ultrasonic welding system 100 and embodiments thereof). As is understood by those skilled in the art, certain steps included in the flow diagram may be omitted; certain additional steps may be added; and the order of the steps may be altered from the order illustrated—all within the scope of the invention.

At Step 500, a conductive pin supply (e.g., conductive pin supply 210), including a plurality of conductive pins (e.g., conductive pin 210a), is provided (e.g., see FIG. 2A). At Step 502, a conductive pin (e.g., conductive pin 210a) is moved from the conductive pin supply to a pin singulator (e.g., see pin singulator 211 of FIG. 2A). In certain embodiments, the conductive pin is oriented in a predetermined orientation (e.g., a heads up orientation) prior to being received by the pin singulator (e.g., see conductive pin 210a held by pin singulator 211 in a heads up orientation in FIG. 2A). At Step 504, the conductive pin is moved from the pin singulator to a pin buffer of a pin transfer structure (e.g., pin buffer 205 of pin transfer structure 203) (e.g., see FIG. 2B). At Step 506, the conductive pin is transferred from the pin buffer to a moveable assembly (e.g., moveable assembly 206) of the pin transfer structure (e.g., see FIG. 2C). At Step 508, the conductive pin is positioned below a sonotrode (e.g., sonotrode 202) using the moveable assembly (e.g., see FIG. 2D). At Step 510, the conductive pin is withdrawn (e.g., using vacuum) from the moveable assembly to the sonotrode (e.g., see FIGS. 2E-2G). At Step 512, the conductive pin is ultrasonically welded (e.g., using torsional motion) to a workpiece using the sonotrode (e.g., see FIG. 2I).

Although the invention has primarily been described with respect to the transfer of a single conductive pin 210a from a pin supply (e.g., conductive pin supply 210) to a sonotrode 202, the invention is not limited thereto. That is, aspects of the invention relate to multiple conductive pins 210a being processed at the same time. For example, pin singulator 211 may provide multiple conductive pins 210a in a predetermined orientation simultaneously, to one or more pin supply tubes.

In a specific example, conductive pins 210a of different types/lengths may be configured to be welded to a single workpiece (or multiple workpieces). In such a situation, a first type of conductive pin 210a may be provided by pin singulator 211 to a first supply tube 208, and a second type of conductive pin 210a may be provided by pin singulator 211 to a second supply tube 208. Depending on which type of conductive pin 210a is now ready to be welded using sonotrode 202, pin buffer 205 may receive such a conductive pin 210a from the relevant supply tube.

Further still, pin buffer 205 may receive (and/or hold) more than one conductive pin 210a at the same time. Further still, moveable assembly 206 may receive (and/or hold) more than one conductive pin 210a at the same time. Thus, it is possible that sonotrode 202 may withdraw a conductive pin 210a from moveable assembly 206 as desired for the application (e.g., where moveable assembly 206 holds multiple conductive pins 210a, which may be of different types).

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. An ultrasonic welding system comprising:
   a sonotrode configured to ultrasonically weld a conductive pin to a workpiece; and
   a pin feeding system configured to feed the conductive pin to the sonotrode, the pin feeding system including a pin supply tube and a pin transfer structure for transferring the conductive pin from the pin supply tube to the sonotrode, the pin transfer structure including a pin buffer for staging the conductive pin prior to transfer to the sonotrode.

2. The ultrasonic welding system of claim 1 wherein the conductive pin is moved through the pin supply tube using at least one of (i) vacuum pressure and (ii) pneumatic pressure.

3. The ultrasonic welding system of claim 1 further comprising a pin supply including a plurality of conductive pins.

4. The ultrasonic welding system of claim 1 further comprising a pin singulator for providing the conductive pin in a predetermined orientation to the pin supply tube.

5. The ultrasonic welding system of claim 4 wherein the predetermined orientation is in a heads up orientation such that a head of the conductive pin is drawn into the pin supply tube as it travels toward the sonotrode.

6. The ultrasonic welding system of claim 1 wherein the pin transfer structure includes a moveable assembly for moving the conductive pin to a position adjacent a working end of the sonotrode.

7. The ultrasonic welding system of claim 6 wherein the sonotrode is configured to withdraw the conductive pin from the moveable assembly using a vacuum source integrated with the sonotrode.

8. The ultrasonic welding system of claim 6 further comprising an actuatable valve that allows the conductive pin to be transferred from the pin buffer to the moveable assembly when the valve is in an open position, and that retains the conductive pin at the pin buffer when the valve is in a closed position.

9. An ultrasonic welding system comprising:
   a sonotrode configured to ultrasonically weld a conductive pin to a workpiece; and
   a pin feeding system configured to feed the conductive pin to the sonotrode, the pin feeding system including a pin supply tube and a pin transfer structure for transferring the conductive pin from the pin supply tube to the sonotrode, the pin transfer structure including a moveable assembly for moving the conductive pin to a position adjacent a working end of the sonotrode.

10. The ultrasonic welding system of claim 9 wherein the conductive pin is moved through the pin supply tube using at least one of (i) vacuum pressure and (ii) pneumatic pressure.

11. The ultrasonic welding system of claim 9 further comprising a pin supply including a plurality of conductive pins.

12. The ultrasonic welding system of claim 9 further comprising a pin singulator for providing the conductive pin in a predetermined orientation to the pin supply tube.

13. The ultrasonic welding system of claim 12 wherein the predetermined orientation is in a heads up orientation such that a head of the conductive pin is drawn into the pin supply tube as it travels toward the sonotrode.

* * * * *